April 24, 1945.  N. ERLAND AF KLEEN  2,374,184
ABSORPTION REFRIGERATING APPARATUS
Filed Aug. 6, 1941  4 Sheets-Sheet 1
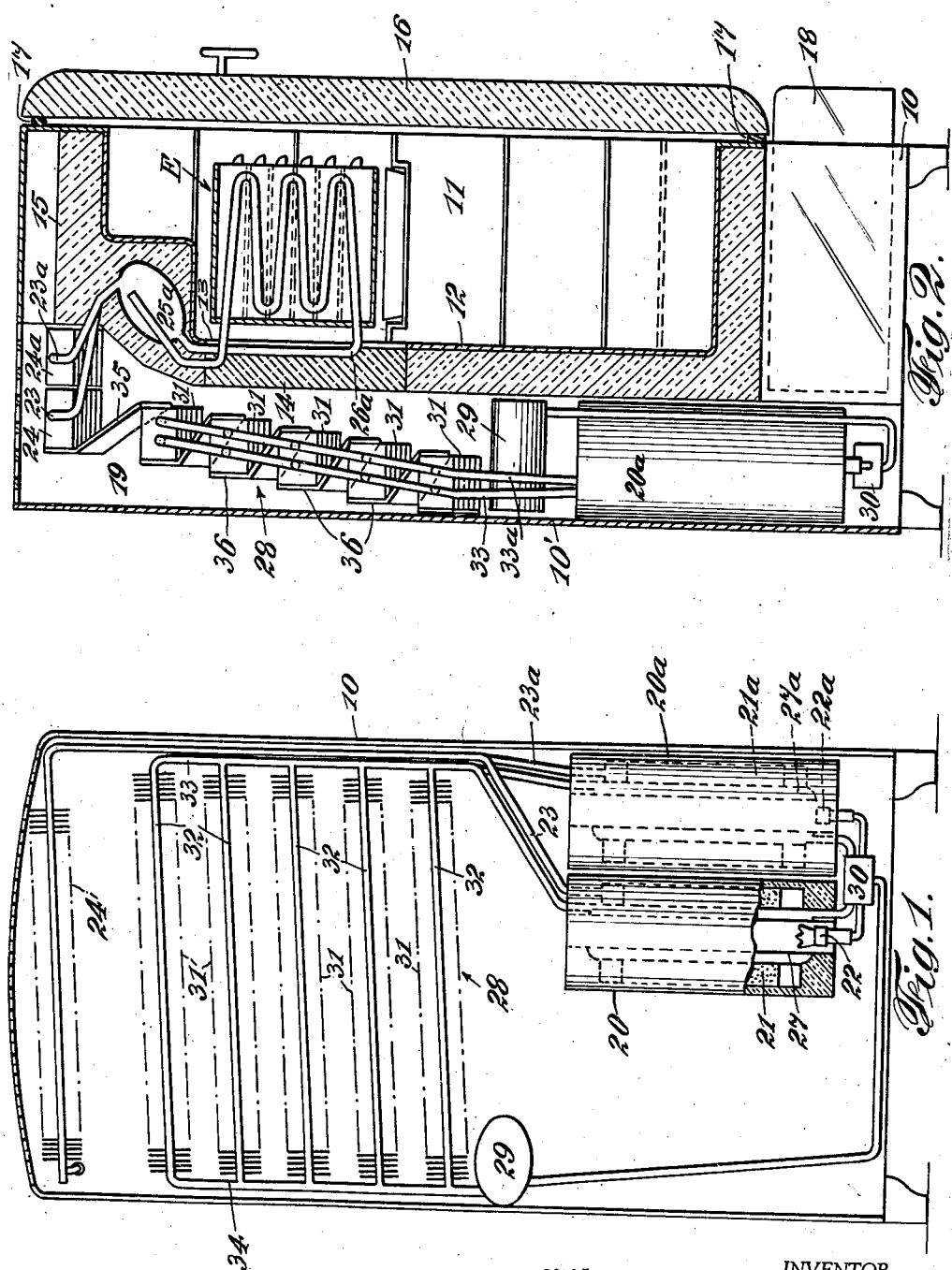
INVENTOR.
Nils Erland af Kleen
BY C. P. Goepel
his ATTORNEY INVENTOR.
Nils Erland af Kleen
BY C. P. Goepel
his ATTORNEY April 24, 1945.　　　N. ERLAND AF KLEEN　　　2,374,184
ABSORPTION REFRIGERATING APPARATUS
Filed Aug. 6, 1941　　　4 Sheets-Sheet 3

INVENTOR.
Nils Erland af Kleen
BY C. P. Goepel
his ATTORNEY

April 24, 1945.   N. ERLAND AF KLEEN   2,374,184
ABSORPTION REFRIGERATING APPARATUS
Filed Aug. 6, 1941   4 Sheets-Sheet 4

INVENTOR.
Nils Erland af Kleen
BY C. P. Goepel
his ATTORNEY

Patented Apr. 24, 1945

2,374,184

UNITED STATES PATENT OFFICE 2,374,184

ABSORPTION REFRIGERATING APPARATUS

Nils Erland af Kleen, Stockholm, Sweden, assignor to Kleen Refrigerator, Inc., Hoboken, N. J., a corporation of Delaware Application August 6, 1941, Serial No. 405,575

15 Claims. (Cl. 62—118)

This invention relates to new and useful improvements in absorption refrigerating apparatus and consists in a novel construction and arrangement of the heat dissipating parts thereof to effect removal of the rejected heat by a natural draft of air.

The invention consists in an air-cooled condensing system for absorption refrigerating apparatus having a plurality of condensing sections adapted to be cooled by a natural draft of air, certain of said condensing sections forming part of the primary refrigerant circuit of the absorption refrigerating apparatus, and the other condensing sections forming part of a secondary circuit in which a cooling medium is circulated in heat exchange relation with a portion of the primary circuit, the condensing sections of the primary circuit being arranged in a substantially horizontal plane in the upper portion of a flue space, and the condensing sections of the secondary circuit being arranged in one or more substantially vertical plane or planes extending below the first named condensing sections, means being provided for separating the flow of air through the different condensing sections.

The invention will now be described in detail by reference to the accompanying drawings which illustrate by way of examples, a number of embodiments of the invention.

Referring to the drawings in which numerals of like character designate similar parts throughout the several views—

Fig. 1 is a rear elevational view of a refrigerator cabinet with the back wall thereof removed to show the refrigerating apparatus in place in the apparatus chamber, and illustrating one form of arrangement for the primary and secondary condensers;

Fig. 2 is a vertical sectional view taken through the refrigerator cabinet, the refrigerating apparatus being shown in side elevation looking from the right hand side of Fig. 1;

Figure 3:
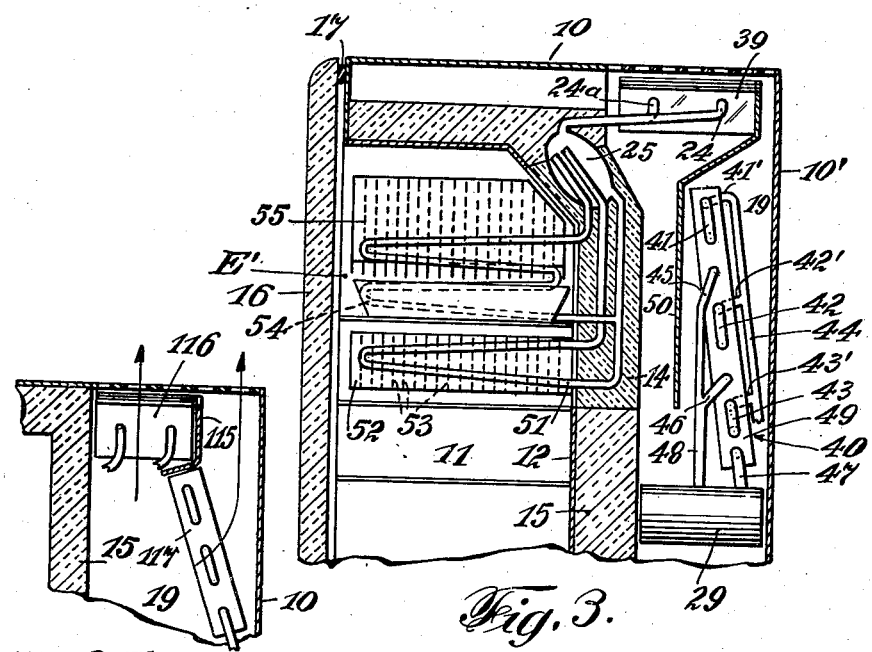
Fig. 3 is a vertical sectional view taken through a portion of a refrigerator cabinet looking from the left hand side of Fig. 1 and illustrating a modified form of primary and secondary condensers.

In the drawings, referring more particularly to Figs. 1 and 2, the refrigerator cabinet illustrated consists generally of an outer shell 10 having an opening in the front wall thereof for access to an insulated storage compartment 11 formed by an inner shell 12 open at its front end and provided with an opening 13 in the rear wall thereof adapted to be closed by a removable section 14 in the rear wall of insulation 15 surrounding the storage compartment. The open front end of the storage compartment 11 is closed by an insulated door 16 provided on its inner face with a sealing gasket 17 of rubber or other suitable material adapted to cooperate with the front wall of the outer shell 10. The insulated storage compartment 11 is spaced inwardly from the outer shell 10 to provide a storage bin 18 in the bottom of the cabinet and a vertical apparatus chamber 19 in the back of the cabinet, which chamber is open at the top and bottom to form an air flue.

The refrigerating apparatus employed to cool the storage compartment 11 is of the absorption type and as an example, I have shown two intermittent absorption refrigerating units arranged side by side and operating in out of phase relation to each other to produce substantially continuous refrigeration. Inasmuch as the units are similar to one another, only the various parts of the unit shown at the left hand side of Fig. 1 will be described in detail by reference characters, the corresponding parts for the right hand unit being distinguished by the letter a.

Each unit includes an insulated boiler absorber 20 mounted in the lower portion of the chamber 19 and containing suitable absorbent material 21 for alternately absorbing and liberating during the respective absorbing and generating periods of the unit, the refrigerant employed. During the generating period, the boiler absorber 20 is heated and for this purpose I have shown a gas burner 22. The refrigerant vapors liberated during this period pass upwardly through conduit 23 to an air-cooled condenser 24 which extends substantially horizontally across the upper portion of the chamber 19 from one side thereof to the other. The liquefied refrigerant flows from the condenser 24 to a collecting tank 25, not shown in Fig. 2, but shown in Figs. 3 and 4, disposed in an inwardly recessed portion of the inner shell 12 and preferably embedded in the insulation 15. From the collecting tank, the refrigerant flows through a cooling coil similar to that shown at 26a in Fig. 2 but disposed on the opposite side of the evaporator unit E, said coil extending into the compartment 11 through the opening 13 in the rear wall of the inner shell 12.

During the absorbing period, the boiler absorber 20 is cooled by a cooling fluid circulating through a closed secondary system formed by a plurality of interconnected elements including a vaporization chamber 27 in heat exchange relation with the boiler absorber, an air cooled secondary condenser generally indicated as 28, and a collecting tank 29. The flow of cooling fluid from the collecting tank 29 to the vaporization chambers 27 and 27a to cool the respective boiler-absorbers 20 and 20a intermittently and in out of phase relation to one another, and the admission of fuel to the burners 22 and 22a to heat the respective boiler absorbers 20 and 20a intermittently and in out of phase relation to the cooling thereof are controlled by the usual change-over device 30.

The primary condensers 24 and 24a are arranged side by side in the same horizontal plane but preferably slope downwardly from their respective inlets, said condensers being disposed in the widened top portion of the chamber 19 formed by an inset in the rear wall of the insulation 15, whereby a free space is provided between the rear wall of the shell 10 and the adjacent side of the cooling section for the passage of heated air from the secondary condenser 28 which, in the form shown, consists of a plurality of horizontally extending finned cooling sections 31 disposed in a substantially vertical plane and preferably arranged in stepped relation with respect to one another. The cooling fluid enters the respective condensing sections 31 by way of branch conduits 32 and 32a connected into separate manifold conduits 33 and 33a leading from the boiler absorber jackets 27 and 27a, respectively, and the liquefied cooling fluid leaving the different condensing sections 31 flows into separate manifold pipes 34 and 34a leading to the collecting tank 29. As clearly shown in Fig. 1, the condensing sections 31 slope downwardly from their inlet side towards their outlet side for the gravity flow of the liquefied cooling fluid. The heated air leaving the several cooling sections 31 of the secondary condenser 28 is prevented from flowing through the primary condensers 24 and 24a by a baffle plate 35 while the heated air from each condensing section 31 is prevented from passing through any other section by a plurality of baffles 36 which separate the several cooling sections 31.

It will thus be seen that with this construction and arrangement of the cooling sections of the primary and secondary condensers a natural draft of air is provided in the chamber 19. The unheated air entering the bottom of the chamber 14 and passing through the different condensing sections takes up the heat therefrom and conducts it upwardly out of the chamber through the open top.

Preferably, the rear wall 10', of the outer shell 10 is removably secured in place by any suitable means (not shown) to enable the refrigerating apparatus to be moved bodily into position in the cabinet and to be removed therefrom.

In Fig. 3 the fins of the primary condensers 24 and 24a are connected together to form a single horizontal bank 39 which slopes downwardly from the inlet side to the outlet side thereof. Furthermore, a modified form of secondary condenser 40 is shown consisting of a plurality of horizontally extending flat coil pipes 41, 42 and 43 separately connected through different branches 41', 42' and 43' to a manifold conduit 44 disposed adjacent one side of the condenser and leading upwardly from the vaporizing portion of the secondary system. On the opposite side of the condenser 40, each of the coil pipes 41, 42 and 43 is connected with a separate outlet conduit 45, 46 and 47 which may be connected to a common manifold 48, such as shown for conduits 45 and 46, leading to the collecting tank 29, or the outlet conduits may be separately connected to the collecting tank such as shown for conduit 47.

The coil pipes 41, 42 and 43 are joined together by common transverse heat dissipating members or fins 49 to form a single substantially vertical bank of cooling coils in the chamber 19 below the primary condensing system. The bank of cooling coils forming the secondary condensing system 40 may be tilted from the vertical and the upward flow of air in the chamber 19 divided into two streams or paths by a baffle 50 which extends upwardly along the inner face of the secondary condensing system 40 and terminates at its upper end in an off-set vertical portion disposed along the outer face of the primary condensing system 39 so that the air enters and leaves the respective condensing systems in separate streams.

The evaporator unit E' shown in this figure consists of a cooling coil 51 having welded thereto a vertical plate 52 provided with fins 53 to cool the air in the storage compartment 11. A branch conduit 54 is connected to the coil 51 and has one portion arranged in thermal contact with one side of the ice-freezing compartment of the evaporator unit and a separate portion having a vertically finned plate 55 welded thereto extending upwardly above the ice-freezing compartment and spaced therefrom to provide for additional air cooling in the storage compartment 11 above or around the ice-freezing compartment as more fully described and illustrated in my co-pending application, Ser. No. 418,925, filed November 13, 1941.

Figures 4, 5:
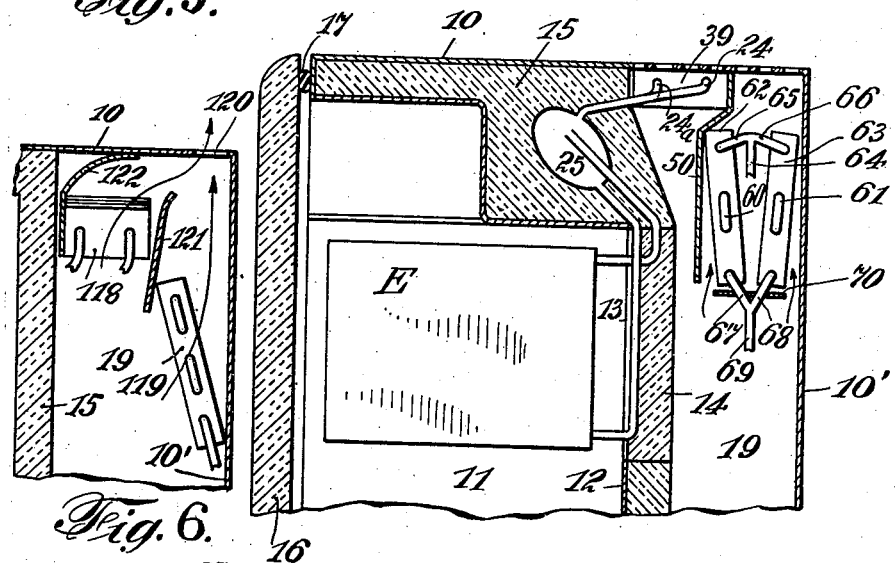
Fig. 4 is a sectional view similar to Fig. 3 of another modified form of secondary condenser construction and arrangement.
Fig. 5 is a vertical sectional view taken through the upper portion of a refrigerator cabinet and showing another modified arrangement of primary and secondary condensers including a baffle plate for dividing the outlet flow of air from the respective condensers.

In Fig. 4, the secondary condensing system is shown arranged in two upwardly diverging banks of horizontal coils 60 and 61 provided with heat dissipating members 62 and 63, respectively. In this form of the invention, the cooling medium enters the upper portion of each coil bank by way of conduit 64 which terminates in two branches 65 and 66 sloping downwardly in opposite directions and connected into the coils 60 and 61, respectively, while the liquefied medium leaves the bottoms of the respective coil banks through conduits 67 and 68 which converge toward each other and terminate in communication with a common pipe 69 leading to the collecting tank (not shown).

The heated air leaving the respective banks of coils 60 and 61 is prevented from flowing through the primary condenser 39 by baffle plate 50 dividing the air flowing through the upper portion of the chamber 19 into separate paths. If desired, a horizontal baffle plate 70 may be arranged immediately below the banks of coils 60, 61, to divert the upward flow of air in the chamber 19 into separate paths or streams entering the respective banks from opposite sides as indicated by the arrows.

Where it is only necessary to divide the flow of air leaving the respective condensing systems into separate paths or streams, a baffle such as shown at 115 in Fig. 5 may be employed, provided with a vertical upper portion extending along the outer face of the horizontally disposed primary condensing system 116 and with an angularly extending lower portion overlying the top of the substantially vertically disposed secondary condensing system 117.

Figures 6, 7:
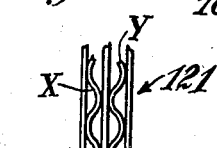
Fig. 6 is a similar view of a modified arrangement of baffle members for the flow of air from the respective condensers to a common outlet.
Fig. 7 is an enlarged fragmentary detail view of one form of baffle employed to separate the air flow from the different condensers.

It may be desirable in certain installations to so arrange the condensing systems that the heated air leaving one condensing system will create a draft to speed up the air flow through the other condensing system. One form of such an arrangement is shown in Fig. 6 wherein the separate streams of heated air from the primary and secondary condensing systems 118 and 119, respectively, pass through a common discharge opening 120 in the top wall of the outer shell 10 preferably adjacent the rear portion of the chamber 19. A suitable baffle 121 extending along the outer face of the primary condensing system 118 and the upper portion of the inner face of the secondary condensing system 119 prevents the flow of heated air from one condensing system to the other, and a second baffle 122 extending upwardly along the inner face of the primary condensing system 118 terminates in a curved portion extending outwardly toward the discharge opening 120. Thus, the air leaving one condensing system, for example, condenser 118, creates a draft which will induce the flow of fresh air upwardly from the bottom of chamber 19 through the other condensing system to cool the latter.

The different forms of baffles heretofore described for dividing the air flow in the chamber 19 into separate paths may be constructed of any suitable material. In Fig. 7 I have shown, as an example, baffle 121 composed of two plies X and Y, respectively, of corrugated paper or card board, the corrugations acting as insulation to prevent heat transfer.

Figure 8:
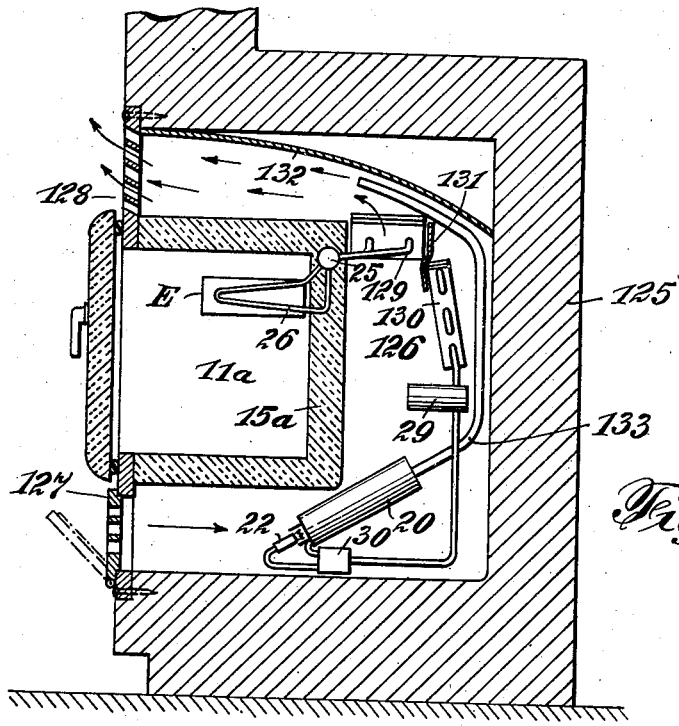
Fig. 8 is a vertical section through a built-in refrigerator and illustrating a further modification of the invention.

In Fig. 8, the invention is shown in connection with a built-in refrigerator comprising an insulated storage comparentment 11a mounted in spaced relation to the walls of a recess provided in a wall or partition 125 to form a chamber 126 extending along the bottom, rear and top insulated walls 15a of the compartment. In this type of installation the air enters the chamber 126 through a slotted door 127 in the front of the built-in refrigerator below the storage compartment 11a and leaves the chamber through a louver section 128 also in the front of the refrigerator but above the storage compartment. As in the previously described constructions, the primary condensing system generally indicated as 129 is arranged in a substantially horizontal plane and the secondary condensing system 130 is arranged in a substantially vertical plane both disposed in the vertical portion of chamber 126 and arranged one above the other. The air flow in the chamber 126 is divided into separate streams by a suitably shaped baffle 131 so that each condensing system is cooled by a separate stream of fresh air.

In order to increase the velocity of air flow toward the outlet formed by the louver section 128, a plate member 132 preferably curved substantially in a form of a parabola extends diagonally across the top of the vertical portion of the chamber 126 from the rear wall of the recess and longitudinally along the upper part of the horizontal portion of the chamber toward the discharge opening to gradually increase the cross-sectional area of the air passage from the primary and secondary condensing systems as clearly shown in the drawings.

The gases of combustion from the burner 22 employed to heat the generating part 20 of the refrigerating apparatus, pass upwardly through a flue or stack 133 which terminates in a forwardly extending curved portion directed toward the louver section 128 to thereby create a draft inducing the flow of fresh air through the chamber.

Figure 9:
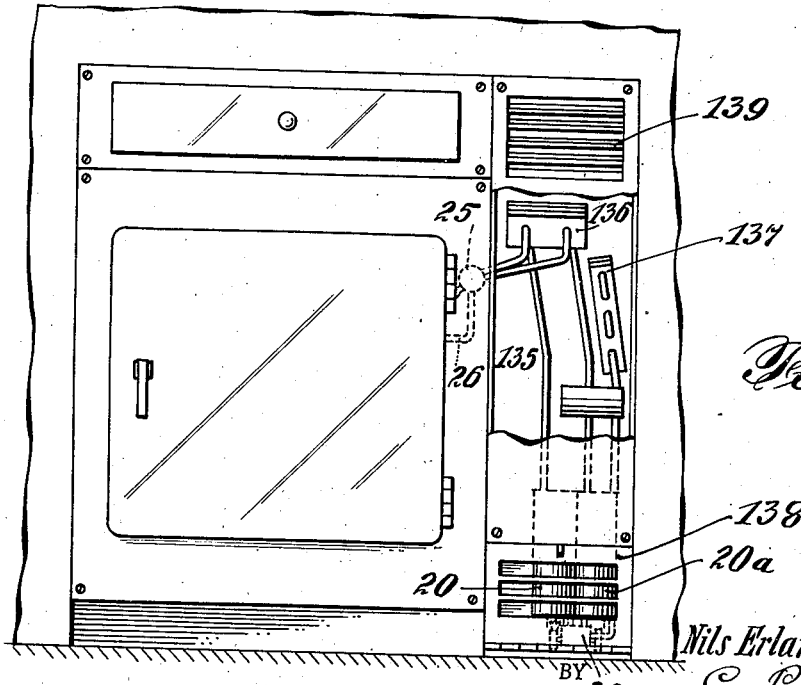
Fig. 9 is a view in front elevation partly broken away of a refrigerator wherein the refrigerating apparatus is disposed in a chamber arranged along one side of the storage compartment.

In Fig. 9, a built-in refrigerator is shown as an example of a still different type of installation where the apparatus chamber 135 is provided along one side of the storage compartment and in the bottom of which are mounted the generating parts 20 and 20a of two alternately operating units, arranged side by side. The primary condensing system 136 arranged in a substantially horizontal plane is disposed in the upper portion of the chamber, and the secondary condensing system 137 arranged in a substantially vertical plane is mounted below the primary condensing system. Atmospheric air is admitted to the bottom of the chamber 135 through a slotted door 138 in the front wall thereof and the heated air leaving the respective condensing systems is discharged through a louver section 139 provided in the front wall of the chamber adjacent the top thereof.

Figure 10:
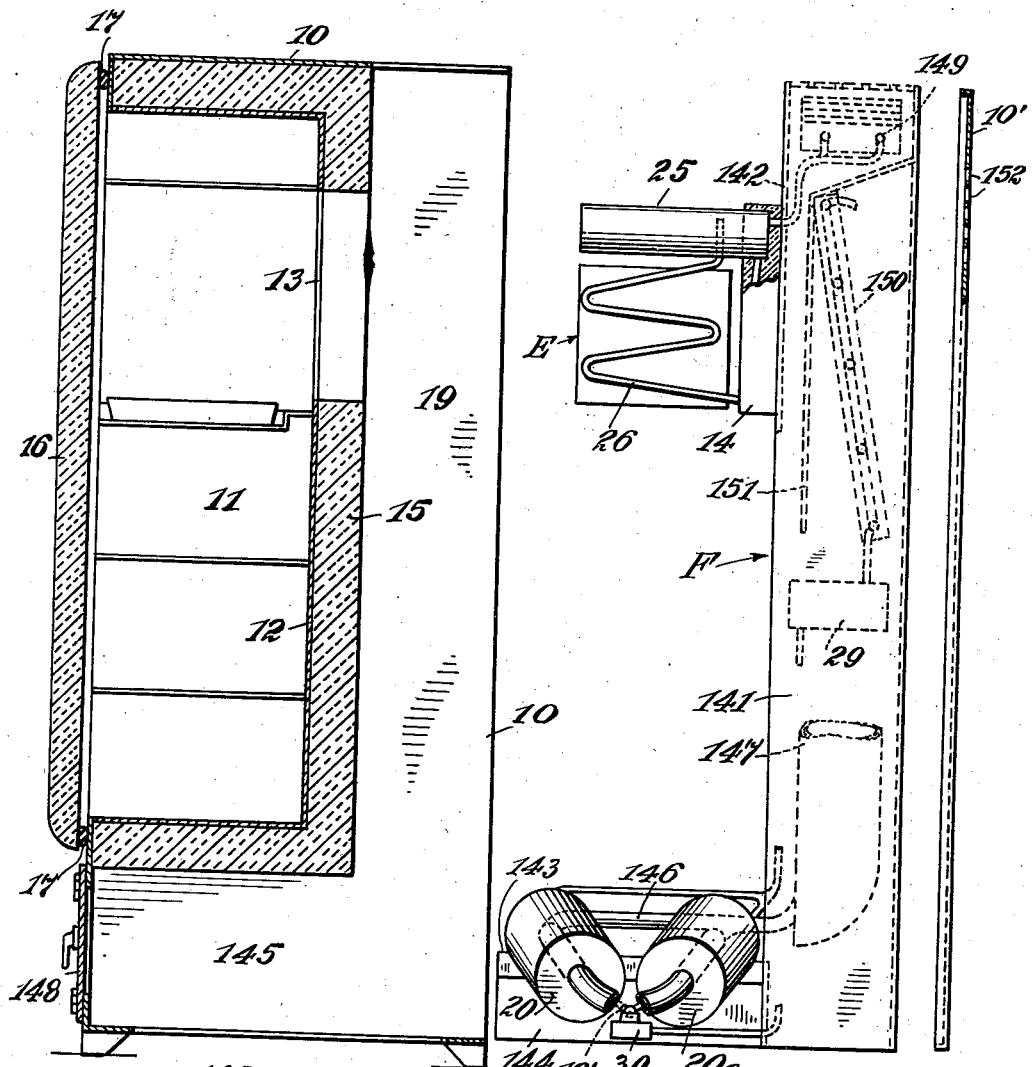
Fig. 10 is a vertical section through the storage compartment of a refrigerator, with the refrigerating apparatus mounted on a frame shown in side elevation and withdrawn from the refrigerator cabinet.
Figure 11:
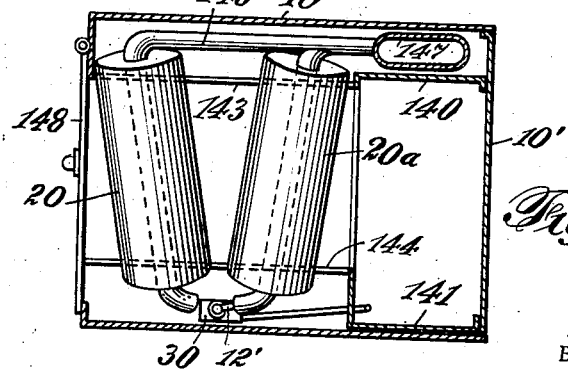
Fig. 11 is a horizontal section through the lower portion of the cabinet shown in Fig. 10 with the frame for the apparatus in place in the cabinet.

While I have shown and described the refrigerator of Fig. 9 as a built-in type of refrigerator, obviously the same arrangement may be provided in a cabinet type of refrigerator where the apparatus is mounted along one side of the storage compartment instead of at the back. Moreover, as shown in Figs. 10 and 11, the refrigerating apparatus may be mounted on a movable frame F, having a vertical portion formed by a pair of transversely spaced vertical side walls 140 and 141 joined together adjacent their upper ends along one of their longitudinal edges by a back plate 142, said frame having a horizontal portion formed by a pair of transversely spaced side plates 143 and 144 extending outwardly from the bottom of the side walls 140 and 141, respectively. The boiler absorbers 20 and 20a of the alternately operating intermittent units are mounted transversely across the side plates 143 and 144 in suitable recesses to rest in a substantially horizontal plane so that when the frame F is moved in place in the cabinet, said boiler absorbers are disposed in the space 145 in the bottom of the cabinet below the storage compartment 11.

As clearly shown in Fig. 11, the side plates 143 and 144 are inset with respect to the side walls 140 and 141 and spaced inwardly from the corresponding side walls of the outer shell 10. The space between the side plate 144 and the adjacent side of the shell 10 accommodates the change-over device 30 and a gas-burner 12' which, in this instance is shown mounted on a suitable swivel joint so that it can be swung from a position to direct the flame into the central heating tube of one boiler absorber to that of the other boiler absorber, and vice versa, controlled by the device 30 by any suitable mechanism (not shown). The space between the side plate 143 and the adjacent side wall of the shell 10 accommodates an exhaust manifold 146 connected to the outlet end of each heating tube and terminating in communication with a vertical stack or chimney 147 mounted on the outer face of the side wall 140 for the exhaust of gases of combustion from the burner 12' through the top of the cabinet. Access to the burner 12' from the front of the cabinet is provided by a suitable opening in the lower portion of the front wall of the shell 10, which opening is closed by a door 148. For proper flow of the heating gases from the burner 12' through the central heating tubes, the boiler absorbers 20 and 20a are preferably tilted upwardly toward the exhaust manifold 146 and to this end, the side plate 143 extends slightly above the other side plate 144 as shown in Fig. 10, or the recesses in the plate 144 may be made deeper than those in the other plate.

The primary and secondary condensing systems 149 and 150, respectively, are mounted one above the other in the frame F between the side walls 140 and 141 of the latter, the primary condensing system 149 being arranged in a substantially horizontal plane in the upper portion of the frame and the secondary condensing system 150 being arranged in a substantially vertical plane. As in the case of the previously described constructions and arrangements of condensing systems, a suitably shaped baffle 151 may be employed to divide the air flow through the respective condensing systems into separate streams, said baffle being mounted between the side walls 140 and 141 and extending upwardly along the inner face of the secondary condensing system 150 and terminating at its upper end in an outwardly extending portion across the top of said system so that when the frame F is in place in the cabinet, the heated air leaving the secondary system 150 passes outwardly through suitable openings 152 in the removable rear wall 10' of the cabinet, while heated air from the primary condensing system passes upwardly through the top of the cabinet.

The evaporator unit E together with the conduit connections and refrigerant liquid collecting vessels as well as the removable section 14 of insulation heretofore described are all mounted on the back plate 142 of the frame F. Thus, the entire refrigerating apparatus is supported on the frame F to form a unitary assembly which, when moved into position in the cabinet, the vertical portion of the frame formed by the side walls 140 and 141 occupies the vertical chamber 19 in the back of the cabinet and provides a flue space in which are mounted the heat dissipating parts of the apparatus, while the horizontal bottom portion of the frame formed by the side plates 143 and 144 occupies the space 145 below the insulated storage compartment 11, in which are mounted the generating and absorbing parts of the apparatus.

From the foregoing, it is believed that the construction, assembly and advantages of the present invention may be readily understood by those skilled in the art without further description, it being borne in mind that numerous changes may be made in the details disclosed without departing from the spirit of the invention as set out in the following claims.

What I claim is:

1. In a refrigerator including an insulated storage space and refrigerating apparatus of the absorption type for cooling said space, in combination, a primary system formed by a plurality of interconnected parts for the circulation of the refrigerant, said system including a condensing element for liquefying refrigerant, a secondary system formed by a plurality of interconnected parts for the circulation of a cooling medium in heat exchange relation with a portion of said primary system, said secondary system including a condensing element for liquefying the cooling fluid, said first and second named condensing elements being arranged in a flue space formed by four substantially vertical walls, one of said walls being the insulated rear wall of the storage space, said first named condensing element being arranged in the upper portion of said flue and disposed in a recess provided in said rear insulated wall, and said second named condensing element being disposed below said first named condensing element, and means for separating the air flow through said flue into separate streams for the respective condensing elements.

2. Air-cooled absorption refrigerating apparatus comprising means forming a thermally insulated storage space and a vertical flue space open at the top and bottom and extending along one wall of said storage space for the flow of air, said one wall of the storage space having a vertically offset upper portion increasing the cross sectional area of said flue space at the upper end of the latter, refrigerant evaporating means in said storage space to cool the latter, refrigerant condensing means arranged in a substantially horizontal plane in the enlarged upper end of said flue space and connected to flow refrigerant liquid to said evaporating means, and means for removing absorption heat including condensing means arranged vertically in said flue space below said first-named condensing means, said first-named and second-named condensing means being separated both as to air inlets thereto and air outlets therefrom whereby each condensing means is cooled by a separate stream of unheated air.

3. Air-cooled absorption refrigerating apparatus comprising means forming a thermally insulated storage space and a vertical flue space open at the top and bottom and extending along one wall of said storage space for the flow of air, said one wall of the storage space having a vertically offset upper portion increasing the cross sectional area of said flue space at the upper end of the latter, refrigerant evaporating means in said storage space to cool the latter, refrigerant condensing means arranged in a substantially horizontal plane in the enlarged upper end of said flue space and connected to flow refrigerant liquid to said evaporating means, means for removing absorption heat including condensing means arranged vertically in said flue space below said first-named condensing means, and baffle means in said flue space dividing the air flow through the latter for each of said condensing means.

4. A refrigerator comprising a cabinet having walls forming a thermally insulated storage compartment and a vertical flue space extending along one of the walls of said storage compartment and in open communication with the atmosphere at the top and bottom for the flow of air, the upper portion of said one wall of the storage compartment being inwardly recessed to increase correspondingly the cross-sectional area of the uper portion of the flue space, absorption type refrigeratng apparatus including air-cooled condensing means comprising at least two heat-rejecting parts arranged side by side in a substantially horizontal plane in the enlarged upper portion of said flue space, means for removing absorption heat including air-cooled condensing means arranged substantially vertically in said flue space below said first-named condensing means and having a plurality of heat-rejecting parts, baffle means in said flue space arranged to prevent the upward flow of heated air from one to the other of the heat-rejecting parts of said second-named condensing means, and separate means to prevent the flow of heated air from the heat-rejecting parts of said second-named condensing means in heat exchange relation with the heat-rejecting parts of said first-named condensing means.

5. A refrigerator comprising a cabinet having walls forming a thermally insulated storage compartment and a vertical flue space extending along one of the walls of said compartment and in open communication with the atmosphere at the top and bottom for the flow of air, the upper portion of said one wall of the storage compartment being inwardly recessed to increase correspondingly the cross-sectional area of the upper portion of the flue space, absorption type refrigerating apparatus including air-cooled condensing means comprising at least two heat-rejecting parts arranged side by side in a substanstantially horizontal plane in the enlarged upper portion of said flue space, means for removing absorption heat including air-cooled condensing means comprising a plurality of heat-rejecting parts arranged in stepped relationship one above the other in said flue space below said first-named condensing means, separate baffle plates between the heat-rejecting parts of said second-named condensing means to prevent the flow of heated air from one to the other of said heat-rejecting parts, and means in said flue space arranged to prevent the flow of heated air from said second-named condensing means in heat exchange relation with said first-named condensing means, whereby each of the heat-rejecting parts of said first-named and said second-named condensing means is cooled by a separate stream of unheated air.

6. A refrigerator comprising a cabinet having walls forming a thermally insulated storage compartment and a vertical flue space extending along one of the walls of said compartment and in open communication with the atmosphere at the top and bottom for the flow of air, the upper portion of said one wall of the storage compartment being inwardly recessed to increase correspondingly the cross-sectional area of the upper portion of the flue space, absorption type refrigrating apparatus including air-cooled condensing means comprising at least two heat-rejecting parts arranged side by side in a substantially horizontal plane in the enlarged upper portion of said flue space, a heat transfer system for removing absorption heat including air-cooled condensing means arranged substantially vertically in said flue space below said first-named condensing means and comprising at least two pipe coils tilted from the vertical to increase the flow of air in thermal exchange relation therewith, and baffle means in said flue space to prevent the upward flow of heated air from said second-named condensing means in heat exchange relation with the heat-rejecting parts of said first-named condensing means, whereby each of said condensing means is cooled by a separate stream of unheated air.

7. A refrigerator comprising a cabinet having walls forming a thermally insulated storage compartment and a vertical flue space extending along one of the walls of said storage compartment and in open communication to the atmosphere at its top and bottom for the flow of air, the upper portion of said one wall of the storage compartment being inwardly recessed to increase correspondingly the cross-sectional area of the upper portion of the flue space, absorption type refrigerating apparatus including air-cooled condensing means comprising at least two heat-rejecting parts arranged side by side in a substantially horizontal plane in the upper enlarged portion of said flue space, a heat transfer system for removing absorption heat including air-cooled condensing means in said flue space below said first-named condensing means and divided into two heat-rejecting portions arranged side by side in separate substantially vertical planes, and baffle means in said flue space arranged to prevent the upward flow of heated air from said second-named condensing means in heat exchange relation with said first-named condensing means.

8. A refrigerator comprising a cabinet having walls forming a thermally insulated storage compartment and a vertical flue space extending along one of the walls of said storage compartment and in open communication with the atmosphere at the top and bottom for the flow of air, the upper portion of said one wall of the storage compartment being inwardly recessed to increase correspondingly the cross-sectional area of the upper portion of the flue space, absorption type refrigerating apparatus including air-cooled condensing means comprising at least two heat-rejecting parts arranged side by side in a substantially horizontal plane in the upper enlarged portion of said flue space, a heat transfer system for removing absorption heat including air-cooled condensing means arranged substantially vertically in said flue space below said first-named condensing means and comprising two banks of pipe coils disposed in upwardly diverging planes, baffle means in said flue space arranged to prevent the upward flow of heated air from said second-named condensing means in heat exchange relation with said first-named condensing means, and other baffle means adjacent the lower ends of said banks arranged to direct the air for passage in thermal exchange relation with said banks from the outer faces thereof.

9. Absorption type refrigerating apparatus including air-cooled condensing means comprising at least two heat-rejecting parts arranged side by side in a substantially horizontal plane, a heat transfer system for removing absorption heat including air-cooled condensing means disposed below said first-named condensing means and comprising a plurality of condensing sections connected for the parallel flow of the heat transferring fluid and arranged in vertically offset relationship one above the other, and means including walls forming a housing for said first-named and second-named condensing means in open communication with the atmosphere at the top and bottom and with the upper portion of the housing enlarged to accommodate said first-named condensing means and provide a separate outlet space adjacent the latter for heated air from said second-named condensing means.

10. Absorption type refrigerating apparatus including air-cooled condensing means comprising at least two heat-rejecting parts arranged side by side in a substantially horizontal plane, a heat transfer system for removing absorption heat including air-cooled condensing means disposed below said first-named condensing means and comprising a plurality of pipe coils connected for the parallel flow of the heat transferring fluid and arranged substantially vertically, and means including walls forming a housing for said first-named and second-named condensing means in open communication with the atmosphere at the top and bottom and with the upper portion of the housing enlarged to accommodate said first-named condensing means and provide a separate outlet space adjacent the latter for heated air from said second-named condensing means.

11. Absorption type refrigerating apparatus including air-cooled condensing means comprising at least two heat-rejecting parts arranged side by side in a substantially horizontal plane, a heat transfer system for removing absorption heat including air-cooled condensing means comprising a plurality of pipe coils connected for the parallel flow of the heat transferring fluid and arranged in a substantially upright bank below said first-named condensing means, and means including walls forming a housing for said first-named and second-named condensing means in open communication with the atmosphere at the top and bottom and with the upper portion of the housing enlarged to accommodate said first-named condensing means and provide a separate outlet space adjacent the latter for heated air from said second-named condensing means.

12. Absorption type refrigerating apparatus including air-cooled condensing means comprising at least two heat-rejecting parts arranged side by side in a substantially horizontal plane, a heat transfer system for removing absorption heat including air-cooled condensing means disposed below said first-named condensing means and comprising two substantially upright banks of pipe coils connected for the parallel flow of the heat transferring fluid and arranged in diverging planes, and means including walls forming a housing for said first-named and second-named condensing means in open communication with the atmosphere at the top and bottom and with the upper portion of the housing enlarged to accommodate said first-named condensing means and provide a separate outlet space adjacent the latter for heated air from said second-named condensing means.

13. A refrigerator comprising a cabinet having a thermally insulated compartment to be cooled and a chamber extending vertically along one of the walls of said compartment and in open communication with the atmosphere at its upper and lower portions for the flow of cooling air; a pair of intermittent type absorption refrigerating units having alternate generating and absorbing periods and operating in out of phase relation to one another to provide substantially continuous refrigeration, each of said units including an evaporator and a condenser, said evaporators being arranged in said compartment to cool the latter, and said condensers being arranged side by side in a substantially horizontal plane in the upper portion of said chamber to be cooled by air; a secondary cooling system for removing the absorption heat from each of said refrigerating units including a condenser arranged substantially vertically in said chamber below said first named condensers and having a plurality of condenser parts to be cooled by air; and means for diverting the upward flow of heated air in said chamber from the condenser parts of said second named condenser out of heat exchange relation with said first named condensers.

14. A refrigerator comprising a cabinet having a thermally insulated compartment to be cooled and a chamber extending vertically along one of the walls of said compartment and in open communication with the atmosphere at its upper and lower portions for the flow of cooling air; a pair of intermittent type absorption refrigerating units having alternate generating and absorbing periods and operating in out of phase relation to one another to provide substantially continuous refrigeration, each of said units including an evaporator and a condenser, said evaporators being arranged in said compartment to cool the latter, and said condensers being arranged side by side in a substantially horizontal plane in the upper portion of said chamber to be cooled by air; a secondary cooling system for removing the absorption heat from each of said refrigerating units including a condenser divided into two substantially vertical portions arranged in said chamber below the said first named condensers to be cooled by air; and means for diverting the upward flow of heated air in said chamber from both portions of said second named condenser out of heat exchange relation with said first named condensers.

15. A refrigerator as claimed in claim 14 wherein the two portions of the second named condenser are arranged in diverging planes.

NILS ERLAND AF KLEEN.